United States Patent [19]

Greenberg

[11] Patent Number: 5,220,606
[45] Date of Patent: Jun. 15, 1993

[54] CRYPTOGRAPHIC SYSTEM AND METHOD

[76] Inventor: Harold Greenberg, 630 W. 246 St., Apt. 1134, Bronx, N.Y. 10471

[21] Appl. No.: 832,974

[22] Filed: Feb. 10, 1992

[51] Int. Cl.$^5$ ............................................. H04L 9/00
[52] U.S. Cl. ........................................ 380/43; 380/28; 380/44
[58] Field of Search ............................. 380/28, 43, 44

[56] References Cited

U.S. PATENT DOCUMENTS

| | | | |
|---|---|---|---|
| 4,165,444 | 8/1979 | Gordon | 380/28 |
| 4,797,921 | 1/1989 | Shiraishi | 380/28 |
| 4,878,246 | 10/1989 | Pastor et al. | 380/44 |
| 4,972,475 | 11/1990 | Sant'Anselmo | 380/54 |
| 5,008,938 | 4/1991 | Freeburg et al. | 380/50 |
| 5,031,129 | 7/1991 | Powell et al. | 364/717 |

Primary Examiner—Gilberto Barrón, Jr.
Attorney, Agent, or Firm—George Grayson

[57] ABSTRACT

I present a cryptographic communications system and method. The system includes a communications channel that is coupled to an encryption device and to a decryption device. A sender's plaintext message is encoded into ciphertext at the encryption device by first transforming the plaintext into a number sequence M. The encryption device couples the sender's signature S with an encoding key K to convert M into a ciphertext C. Ciphertext C is then transmitted over the communications channel to the intended receiver of the message.

The receiver's decryption device acquires the ciphertext C. The decryption device takes the sender's signature S and the encoding key K and develops an inverted form of S which is the sequence T. The device uses T and K to decode C and obtain the digital message M. Sequence M is then converted to the original plaintext message.

The sender's signature S is known at the encryption and decryption devices. S is kept secret from unauthorized persons. The encoding key K is developed by either of two alternatives. In one alternative, K is calculated as a sequence of numbers from the coupling of S with a sequence of random numbers R. In a second alternative, a sequence of random numbers R is developed in special relation to S and the encoding key K is then taken equal to R. In both alternatives, the sequence of random numbers R may be public. Any eavesdropper must have knowledge of the sender's signature S to decode the plaintext message.

The cryptographic method for encryption, decryption, encoding key formation entails the consideration of each of the number sequences M, S, K, C, T, and R as the coefficients of polynomials that are in the finite field $Z_p$ of integers modulo the prime number p. The theory involved in the study of polynomials of this nature comes under the heading of Galois field theory. The calculations in the invention follow Galois theory but are performed using only the coefficients and not the actual polynomials.

6 Claims, 5 Drawing Sheets

CRYPTOGRAPHIC SYSTEM AND METHOD

FIELD OF INVENTION

The invention relates to cryptographic systems and methods and more particularly to the use of Galois fields to represent the coefficients of polynomials modulo a prime number in the encryption of plaintext and the decryption of ciphertext.

DESCRIPTION OF PRIOR ART

Cryptographic systems are used to ensure the secrecy of messages transmitted over insecure communication channels. The secrecy of the message is obtained by converting a plaintext message into ciphertext. The ciphertext is of such a nature than an eavesdropper or unauthorized person will be unable to learn the plaintext content from the ciphertext.

There are two methods that are mainly used in cryptographic systems. In one method, the sender and receiver both have knowledge of a secret cipher key. They may either know the cipher key in advance of any communication between them, or they may exchange the cipher key over a secure channel to which an unauthorized person does not have access. The cipher key may also be exchanged over an insecure channel using exponential key exchange. This is described by Diffie and Hellman in "New Directions in Cryptography," IEEE Transactions on Information Theory, Vol. 22, 1976, pp. 644–654. The cipher key is then used by the sender to encrypt a message, which is transmitted over an insecure channel. Knowledge of the sender's cipher key then enables the receiver to invert the cipher key and to decrypt the message. The method has been patented by Hellman, Diffie, and Merkle in "Cryptographic Apparatus and Method," U.S. Pat. No. 4,200,770 of Apr. 29, 1980.

In another method, the receiver's enciphering key is public information. The key may be sent to a potential sender over an insecure channel or may appear in a public directory. The sender encrypts a message using the key and transmits the ciphertext to the receiver over an insecure channel. Only the receiver knows the secret inverse of the cipher key and proceeds to decipher the text. The method relies on computational difficulty to insure that no unauthorized person will succeed in calculating the inverse of the enciphering key.

An example of a secret key cryptosystem is the Data Encryption Standard (DES), adopted by the U.S. National Bureau of Standards as the accepted method for encrypting commercial and government information. The present standard appears vulnerable to attack as shown by Diffie and Hellman, "Exhaustive Cryptanalysis of the NBS Data Encryption Standard," Computer, Vol. 10, 1977, pp. 74–84 and by Hellman, "A Cryptanalytic Time-Memory Trade Off," IEEE Transactions on Information Theory, Vol. 26, 1980, pp. 401–406.

Examples of public key cryptosystems are by Rivest, Shamir, and Adleman, "A Method for Obtaining Digital Signatures and Public-Key Cryptosystems," Communications of the ACM, Vol. 21, 1978, pp. 120–126 and Merkle and Hellman, "Hiding Information and Signatures in Trapdoor Knapsacks," IEEE Transactions on Information Theory, Vol. 24, 1978, pp. 525–530.

The Rivest, et al, work depends on the computational difficulty of factoring a number that is the product of two very large prime numbers. The method has been patented by Rivest, Shamir, and Adleman in "Cryptographic Communications System and Method," U.S. Pat. No. 4,405,829 of Sep. 20, 1983.

The Merkle, et al, work depends on the difficulty in solving a linear diophantine equation in nonnegative integers. The method has been patented by Hellman and Merkle in "Public Key Cryptographic Apparatus and Method," U.S. Pat. No. 4,218,582 of Aug. 19, 1980.

While the Rivest, et al, method appears to be feasibly secure with present day knowledge and methods, advances in mathematics and computer technology will make the scheme obsolete in the future. In addition, most of the knapsack schemes have been broken by extremely ingenious analysis. See the review article by Rivest, "Cryptography," in Handbook of Theoretical Computer Science, Leeuwen, ed., 1990, pp. 719–755.

Galois fields have been applied to cryptography by Cooper, "Linear Transformations in Galois Fields and their Application to Cryptography," Cryptologia, Vol. 4, No. 3, 1980, pp. 184–188, and by Cooper and Patterson, "A Generalization of the Knapsack Algorithm using Galois Fields," Cryptologia, Vol. 8, No. 4, 1984, pp. 343–347. The Galois fields in the two papers are represented as the coefficients of polynomials modulo a prime number. In the first paper, Cooper uses a very complicated multiple signature method and a monic irreducible polynomial as encryption key which must be stored. In the second paper, Cooper and Patterson embed polynomials within the knapsack problem as their cryptosystem, but the procedure is not secure as stated by Patterson, Mathematical Cryptology, 1987, p. 91, Rowman and Littlefield, publishers.

SUMMARY OF THE INVENTION

The invention includes an encryption device and a decryption device coupled to an insecure communications channel. The encryption device utilizes the sender's signature and an encoding key to encrypt a plaintext message into ciphertext. The decryption device uses the encoding key and an inverted form of the sender's signature to decrypt the ciphertext. The sender's signature is known at the encryption and decryption devices and is kept secret from unauthorized persons. The encoding key is produced from a string of random numbers, which may be public and thus would have no meaning for unauthorized persons.

The encryption device contains a signature storage device, an alphanumeric to digital converter, and an encoder device. The decryption device contains a signature storage device, a decoder device, and a digital to alphanumeric converter. The invention considers digitized signature and encoding key information of the sender as coefficients of polynomials over a finite field. The sender's plaintext message is converted into digitized form, which the invention also considers as the coefficients of a polynomial. The message polynomial coefficients are encoded into ciphertext through the use of the signature and encoding key polynomial coefficients. The invention at the receiver uses the signature and encoding key information to decipher the message through the use of the polynomial mathematics developed in the invention.

The form of the invention contains an encoding key generating device that is given in either of two alternatives, (a) or (b). In alternative (a), the encoding key generating device contains a signature storage device, a random number generator device, and a key creator device. In alternative (b), the encoding key generating device contains a signature storage device, a random number generator device, and a greatest common divisor testing device.

Key information in the invention can be developed afresh for each message transmitted and need never be stored. Many different modes of key information interchange between sender and receiver are possible. Some of the likely modes follow.

1. Key information is sent from the sender to the receiver. The key information is necessary for the receiver to decode ciphertext from the sender.

2. The intended receiver of a message from an authorized sender transmits the key information to the sender, who uses the key to encode the message.

3. Key information is transmitted between sender and receiver in a disguised or encrypted form.

4. Key information is public and is disseminated in various ways, such as in a public directory.

5. Key information is kept secret and is known only to the sender and receiver previous to any message interchange.

6. Part of the key information is kept secret and part is public. The part of the key that is withheld prevents the eavesdropper from decoding the message. For example, a sender's secret signature may be part of the key.

The encryption device utilizes the sender's secret digitized signature S and the encoding key K. The key K is known at both the sender and the receiver. A plaintext message for transmission is inserted into the encryption device. The plaintext message is converted to its digitized form M. The encryption device uses S and K to encrypt M to the ciphertext C. Ciphertext C may also include an encryption of S itself for reasons of authentication. Ciphertext C is then transmitted over an insecure channel to the authorized receiver. The decryption device at the authorized receiver uses K and its knowledge of S to find the inverse of S. The inverse of S and K are used to decrypt C to the digitized form M, which is converted to the original message.

BRIEF DESCRIPTION OF THE DRAWINGS

FIG. 4b is a flow chart for a cryptographic method that implements a system for decoding into plaintext the ciphertext message developed in the flow chart of FIG. 4a.

FIG. 5a is a flow chart for a method that implements that alternative (a) encoding key generator of FIG. 2a.

DESCRIPTION OF THE PREFERRED EMBODIMENT

The embodiment of my invention disclosure used Galois fields that are represented as the coefficients of polynomials modulo a prime number. The encryption and decryption process relies on the consideration of the digitized form of a message, the signature of the sender, and the encoding key as the coefficients of the polynomials.

In contrast to the Cooper method cited in the Description of Prior Art, the encryption procedure of my invention uses a simple method with a single signature. My method allows for the determination of an encoding key from random numbers, which may be public. The keys are easily calculated anew when necessary, a monic irreducible key polynomial is not required, and key storage is not needed. Hence, the procedures incorporated in my invention represent a distinct improvement over that of Cooper's.

In mathematical terms, all polynomials that are shown below are polynomials whose coefficients are in the finite field $Z_p$ of integers modulo a prime number p. Note that, although the mathematical theory may be in terms of polynomials, all methods and all calculations in the invention are done using the coefficients of the polynomials only. Thus no actual conversion is done to polynomials in the invention.

Encryption/decryption process

Figure 1:
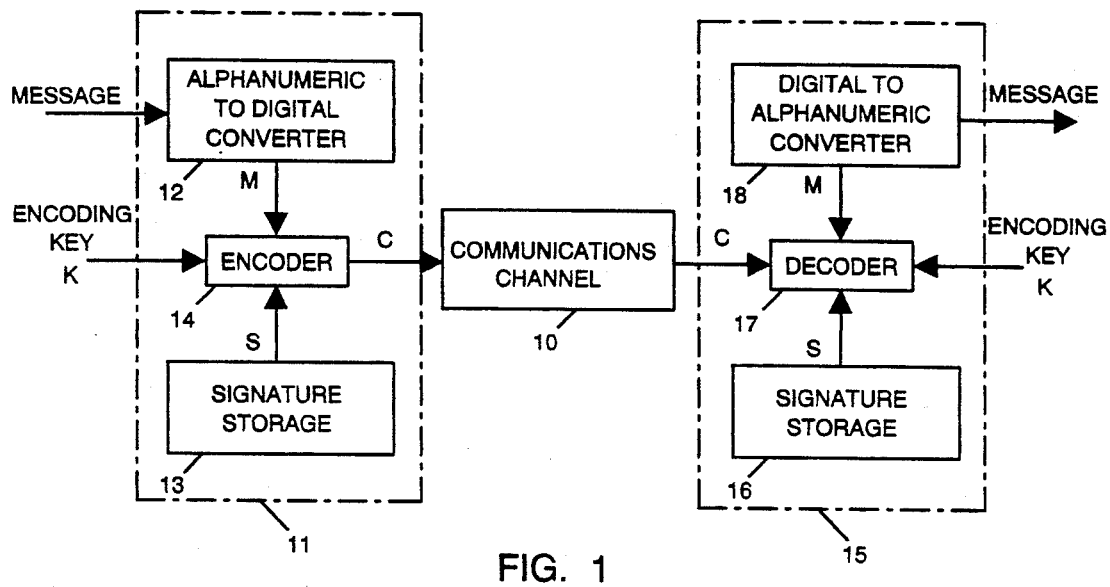
FIG. 1 is a block diagram of a cryptographic system that transmits a computationally secure cryptogram over an insecure communications channel.

Referring to FIG. 1, a cryptographic system is shown in which all communications takes place over an insecure communications channel 10. A sender of a plaintext message uses an encryption device 11 to encode the message for transmission to an authorized receiver. The plaintext message is inserted into the encryption device 11 along with an encoding key K.

Each alphanumeric character in the message is converted to an integer value by an alphanumeric to digital converter 12 to obtain $$M = \{m_0, m_1, \ldots, m_r\}.$$

The $m_i$ values are integers. For example, each English letter in the message is changed to obtain values for M by substituting for each letter of the message an integer such as: A=1, B=2, ..., Z=26. The integers $m_i$ are taken to have values between 1 and p−1, where p is a prime integer. A value of p=37 allows for a message to contain the letters A to Z, blank spaces, and to have various punctuation marks. A value of p=71 will, in addition, allow the message to have lower-case letters and to contain integers between 0 and 9. The number of elements of M may be equal to the number of alphanumeric characters of the message or a block part of the message. The prime number p will be known at all devices and for all methods of the invention.

The encoding key is given by $$K = \{k_0, k_1, \ldots, k_u\},$$

where the $k_i$ are integers. The encoding key may be known in advance, be secret, and stored. The key may be the coefficients of an irreducible polynomial. Instead, in this invention, I will concentrate on keys that are developed when needed from public or nonsecret information, and are not stored. The key will not have to be the coefficients of an irreducible polynomial. The mechanics of producing encoding keys for the devices of FIG. 1 are presented in the encoding key generation section below.

The sender's signature $$S = \{s_0, s_1, \ldots, s_n\}$$

is obtained from a signature storage 13. The $s_i$ values are integers. An encoder 14 receives M, K, and S. Consider M, K, and S as converted to their polynomial forms $$M_1 = m_0 + m_1 x + m_2 x^2 + \ldots + m_r x^r,$$

$$K_1 = k_0 + k_1 x + k_2 x^2 + \ldots + k_u x^u,$$

$$S_1 = s_0 + s_1 x + s_2 x^2 + \ldots + s_n x^n.$$

The encoder 14 produces the ciphertext C by developing the coefficients of the polynomial $C_1$ where $$C_1 = S_1 M_1 \bmod(K_1 \text{ and } p).$$

$C_1$ is given by $$C_1 = c_0 + c_1 x + c_2 x^2 + \ldots + c_v x^v.$$

The coefficients $c_i$ are integers; the encoded message is then $$C = \{c_0, c_1, \ldots, c_v\}.$$

The ciphertext C is transmitted over the communications channel 10 to an authorized receiver. It should be noted, as can be seen in the example below, that the $c_i$ values tend to be random in nature; there is no apparent relationship between the coded values $c_i$ and the message values $m_i$.

Continuing with FIG. 1, the ciphertext C is received by an authorized receiver and decoded at a decryption device 15. The encoding key $$K = \{k_0, k_1, \ldots, k_u\}$$

is inserted into the decryption device 15. The key K is again developed from public or nonsecret sources as explained in the encoding key generation section below.

The sender's signature $$S = \{s_0, s_1, \ldots, s_n\}$$

is obtained from a signature storage 16, which contains the sender's digitized signature among a list of associated communicators to the receiver.

A decoder 17 receives C, K, and S. The polynomial forms of K and S, $$K_1 = k_0 + k_1 x + k_2 x^2 + \ldots + k_u x^u,$$

$$S_1 = s_0 + s_1 x + s_2 x^2 + \ldots + s_n x^n.$$

are the same as before. The decoder 17 first determines the coefficients T of the polynomial $$T_1 = t_0 + t_1 x + t_2 x^2 + \ldots + t_g x^g$$

that satisfies $$S_1 T_1 = 1 \bmod(K_1 \text{ and } p);$$

$T_1$ inverts $S_1$ and T is the inverted form of the sender's signature S. The exact values of the coefficients T that the decoder 17 develops depends on the form of the encoding key K used for the encryption/decryption process. The mechanics of producing the T that inverts S is presented in the inversion of S section below.

The coefficient form of $T_1$ is $$T = \{t_0, t_1, t_2, \ldots, t_g\},$$

where the $t_i$ are integers. The decoder 17 used T with K and S to decode C by determining the digitized message M. Ciphertext C, at the output of the encryption device 11, has the polynomial form given by $$C_1 = c_0 + c_1 x + c_2 x^2 + \ldots + c_v x^v.$$

as obtained from $$C_1 = S_1 M_1 \bmod(K_1 \text{ and } p).$$

Since $T_1$ inverts $S_1$, the decoder 17 obtains the coefficients of $M_1$ from the calculation $$M_1 = C_1 T_1 \bmod(K_1 \text{ and } p).$$

The result is $$M_1 = m_0 + m_1 x + m_2 x^2 + \ldots + m_r x^r.$$

$M_1$ is the digitized polynomial description of the sender's original message. The coefficients of $M_1$ are given by $$M = \{m_0, m_1, \ldots, m_r\}.$$

which is sent to a digital to an alphanumeric converter 18 to obtain the original plaintext message.

Encoding key generation

Figure 2A:
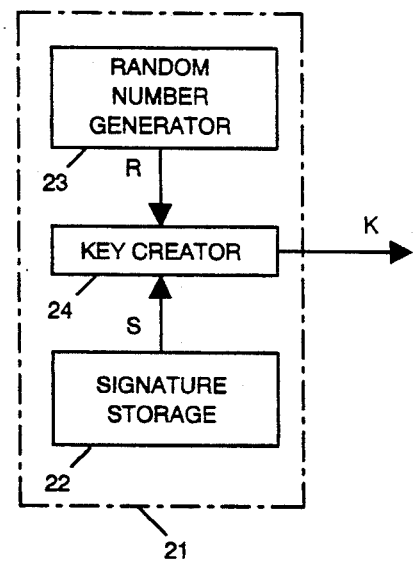
FIG. 2a is a block diagram of a key generator that produces alternative (a) of an encoding key for the cryptographic system of FIG. 1.

FIG. 2a refers to an encoding key generator 21 that produces alternative (a) of an encoding key for the encryption/decryption system of FIG. 1. The encoding key is developed from a sender's digitized signature and a string of random numbers. The sender's signature $$S = \{s_0, s_1, \ldots, s_n\}$$

is obtained from a signature storage 22, which contains the sender's digitized signature. Random numbers between 1 and $p-1$ are shown as being obtained from a random number generator 23. The random numbers must be available to both the sender and receiver. The string of random numbers is given by $$R = \{r_0, r_1, \ldots, r_s\}.$$

S and R are sent to a key creator device 24. Consider S and R as converted to the polynomial forms $$S_1 = s_0 + s_1 x + s_2 x^2 + \ldots + s_n x^n,$$

$$R_1 = r_0 + r_1 x + r_2 x^2 + \ldots + r_s x^s.$$

The key creator device 24 calculates the coefficients of the encoding key polynomial $K_1$ from $$K_1 = S_1 R_1 - 1 \bmod p,$$

resulting in $$K_1 = k_0 + k_1 x + k_2 x^2 + \ldots + k_u x^u,$$

where the $k_i$ are integers. Hence, the encoding key K is given by $$K = \{k_0, k_1, \ldots, k_u\}$$

and is the output of the encoding key generator 21. The encoding key K for alternative (a) becomes available only at the sender's and receiver's devices and is kept secret. The key K is developed from the random numbers R, which may be nonsecret.

Figure 2B:
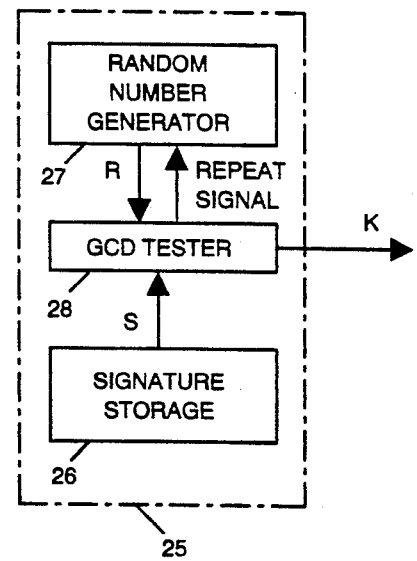
FIG. 2b is a block diagram of a key generator that produces alternative (b) of an encoding key for the cryptographic system of FIG. 1.

FIG. 2b refers to a key generator 25 that produces alternative (b) of an encoding key for the encryption/decryption system of FIG. 1. The encoding key is developed from a sender's digitized signature and a string of random numbers. The sender's signature $$S = \{s_0, s_1, \ldots, s_n\}$$

is obtained from a signature storage 26. Random numbers between 1 and $p-1$ are obtained from a random number generator 27. The string of random numbers is given by $$R = \{r_0, r_1, \ldots, r_s\}.$$

S and R are sent to a GCD tester 28. Consider S and R as converted to the polynomial forms $$S_1 = s_0 + s_1 x + s_2 x^2 + \ldots + s_n x^n,$$

$$R_1 = r_0 + r_1 x + r_2 x^2 + \ldots + r_s x^s.$$

Using S and R directly, the GCD tester 28 finds the greatest common divisor (GCD) over the integers modulo p of $S_1$ and $R_1$. If $GCD(S_1, R_1) = 1$, the encoding key polynomial $K_1$ is defined by $K_1 = R_1$. If the GCD is not one, the process is continued with new R values from the random number generator 27 until the GCD does equal one. Euclid's algorithm is adapted to find the greatest common divisor for polynomials over the integers modulo p. The algorithm is given in the flow chart of FIG. 5b and is explained below. The algorithm is obtained from the methods given in the book by Knuth, Seminumerical Algorithms, Second Edition, pp. 401-416. Furthermore, as follows from the solution to exercise 5 on page 417 of the Knuth book, the probability that $GCD(S_1, R_1) = 1$ is given by $1 - 1/p$ when $S_1$ and $R_1$ are independently and uniformly distributed polynomials and p is a prime number. For example, with $p = 37$, the probability is 0.973. Clearly, a proper R is produced rapidly.

Suppose $K_1$ is of the form $$K_1 = k_0 + k_1 x + k_2 x^2 + \ldots + k_u x^u$$

with $K_1 = R_1$. The key K for alternative (b) is given by $$K = \{k_0, k_1, \ldots, k_u\}$$

and is the output of the encoding key generator 25. The encoding key K may be generated at either the sender or the receiver. The sender of the message may transmit K along with the ciphertext C. The intended receiver of the message may transmit K to the sender before the message is sent. Encoding key K need not be kept secret and may be kept in a public directory ready for use by the sender and receiver.

Inversion of signature S

Referring again to FIG. 1 and the decryption device 15, the decoder 17 must first develop T, the inverted form of the sender's signature S, before determining the digitized message M. The decoder 17 determines the coefficients T of the polynomial $T_1$ that satisfies $$S_1 T_1 = 1 \mod(K_1 \text{ and } p).$$

If encoding generator 21 of FIG. 2a is used, $K_1$ is calculated from $$K_1 = S_1 R_1 - 1 \mod p.$$

Therefore, since $$S_1 R_1 = 1 \mod(K_1 \text{ and } p),$$

the inverse of $S_1$ is given by $R_1$. The decoder 17 obtains R, the coefficients of $R_1$, from the calculation of $K_1$ directly, by the modulo p division of $K_1 + 1$ by $S_1$, or from the public value of R. Hence, the decoder 17 takes $T = R$ as the inverse of signature S.

If encoding generator 25 of FIG. 2b is used, $T_1$, the inverse of $S_1$, is the solution for the polynomial $X_1$ in $$S_1 X_1 = 1 \mod(K_1 \text{ and } p).$$

The decoder 17 uses an extension of the Euclidean algorithm for polynomials over the integers modulo p to determine X, the coefficients of the polynomial $X_1$. The algorithm is given in the flow chart of FIG. 6. At completion of the algorithm, the decoder 17 takes the T value produced as the inverse of signature S.

Exponent size. Decryption by an eavesdropper

The proper operation of the invention requires that there be relationships between the highest exponents of the various polynomials. Also, the exponents must be of sufficient size to prevent an eavesdropper from deciphering the message. A table of the highest exponent for each of the polynomials follows:

| Polynomial | $M_1$ | $S_1$ | $R_1$ | $K_1$ | $T_1$ |
|---|---|---|---|---|---|
| Exponent | r | n | s | u | g |

The requirements for a message to be properly and efficiently encoded and decoded is that $u > r$ and $n + r > u$. In the alternative (a) of encoding key generation, where $K_1 = S_1 R_1 - 1 \mod p$, an additional requirement is that $r > s$.

If the alternative (a) encoding key is used, an eavesdropper who intercepts C, knows R, and wishes to decipher the message must have knowledge of $K_1$ or $S_1$ to calculate the digitized polynomial form $M_1$ of the message from $M_1 = C_1 T_1 \mod(K_1 \text{ and } p)$. To prevent any systematic trying of all possible values for $K_1$ or $S_1$, since $u = n + s$ and $n > u$, it is necessary to take n large enough. Hence, taking $m = 1 + n$, any exhaustive search will force on the order of at least $m^p$ trials to determine $K_1$ or $S_1$ when m and p are themselves known.

In the alternative (b) encoding key generation, an eavesdropper who intercepts C, knows K, and wishes to decipher the message must have knowledge of $T_1$ to calculate the digitized polynomial form $M_1$ of the message from $M_1 = T_1 C_1 \mod(K_1 \text{ and } p)$. If $S_1$ is known then $T_1$ must be solved for from $S_1 T_1 = 1 \mod(K_1 \text{ and } p)$. Since $n + g \geq u$, it is necessary to take u large enough and n on the order of u/2. Hence, taking $m = 1 + n$, any exhaustive search will force on the order of $m^p$ trials to determine $T_1$ or $S_1$.

In either alternative (a) or (b), for example, consider the values in the following table for even moderate values of m and p

| m | 4 | 4 | 15 | 15 |
|---|---|---|---|---|
| p | 37 | 71 | 37 | 71 |
| $m^p$ | $18.9 \cdot 10^{21}$ | $5.6 \cdot 10^{42}$ | $32.8 \cdot 10^{42}$ | $318 \cdot 10^{81}$ |

For comparison with a method that can be broken by exhaustive search, consider the Data Encryption Standard. The Standard uses a key that has 56 bits. An exhaustive key search to break the Standard requires the necessity to check $2^{56} = 7.2 \cdot 10^{16}$ keys.

Clearly, even when it is known that $m = 4$ and $p = 37$ an eavesdropper is required to check $18.9 \cdot 10^{21}$ polynomials. Note that a small signature of 15 digits and an alphabet of 71 characters make any unauthorized deciphering of a message impossible under foreseeable computer advances. Larger values of m and p than those listed are also feasible for the invention. The method of the invention is clearly superior to DES.

In addition, the method of the invention is superior to the public key methods, which rely on an eavesdropper's inability to solve a mathematical problem. This reliance is not infallible; the method of solution for these difficult mathematical problems may have been found and is being kept secret. Moreover, even if not presently known, the method of solution may become common knowledge in the future. In contrast, the method of the invention can always prevent unauthorized decryption of the message by increasing the number of possibilities that must be systematically tried to achieve decryption.

EXAMPLE

As an example of the invention and method, consider the message

KERENSKY IS ALIVE.

which is inserted into the encryption device 11 of FIG. 1. The message is changed by the alphanumeric to digital converter 12 to $M = \{11, 5, 18, 5, 14, 19, 11, 25, 27, 9, 19, 27, 1, 12, 9, 22, 5, 28\}$.

The sender's signature $S = \{3, 14, 4, 12\}$ is obtained from signature storage 13. The polynomial forms for M and S are $M_1 = 11 + 5x + 18x^2 + 5x^3 + 14x^4 + 19x^5 + 11x^6 + 25x^7 + 27x^8 + 9x^9 + 19x^{10} + 27x^{11} + x^{12} + 12x^{13} + 9x^{14} + 22x^{15} + 5x^{16} + 28x^{17}$, $S_1 = 3 + 14x + 4x^2 + 12x^3$.

The encoding key K is developed as in alternative (a) of FIG. 2a or as in alternative (b) of FIG. 2b for insertion into the encryption device 11. The encryption and decryption process will be illustrated for both alternatives.

Example, continues-alternative (a) encoding key

In the encoding key generator 21, the sender's signature S is obtained from signature storage 22. Suppose $p = 71$. The random number generator 23 develops random numbers between 1 and 70 as $R = \{9, 55, 26, 62, 60, 60, 69, 57, 18, 70, 17, 1, 18, 11, 13, 5\}$.

Let R also be available to the intended receiver of the message. The random numbers R need not be secret.

S and R are sent to the key creator device 24. Consider S in its polynomial form $S_1$ and R as converted to the polynomial $R_1 = 9 + 55x + 26x^2 + 62x^3 + 60x^4 + 60x^5 + 69x^6 + 57x^7 + 18x^8 + 70x^9 + 17x^{10} + x^{11} + 18x^{12} + 11x^{13} + 13x^{14} + 5x^{15}$.

The key creator device 24 calculates the coefficients K of the polynomial formed from $K_1 = S_1 R_1 - 1$ mod p. The result for $K_1$ is $K_1 = 26 + 7x + 32x^2 + 26x^3 + 37x^4 + 18x^5 + 43x^6 + 38x^7 + 2x^8 + 27x^9 + 12x^{10} + 27x^{11} + 53x^{12} + 67x^{13} + 64x^{14} + 31x^{15} + 41x^{16} + 34x^{17} + 60x^{18}$ and the encoding key is $K = \{26, 7, 32, 26, 37, 18, 43, 38, 2, 27, 12, 27, 53, 67, 64, 31, 41, 34, 60\}$.

Encoding key K is sent to the encoder 14 together with M and S to form the ciphertext C as the coefficients of the polynomial $C_1$ given by $C_1 = S_1 M_1 \mod(K_1 \text{ and } p)$.

$C_1$ is given by $C_1 = 5 + 57x + 23x^2 + 53x^3 + 33x^4 + 10x^5 + 58x^6 + 25x^7 + 39x^8 + 62x^9 + 55x^{10} + 31x^{11} + 49x^{12} + 16x^{13} + 60x^{14} + 29x^{15} + 19x^{16} + 29x^{17}$;

the encoder 14 produces as output $C = \{5, 57, 23, 53, 33, 10, 58, 25, 39, 62, 55, 31, 49, 16, 60, 29, 19, 29\}$, which is transmitted to the receiver over communications channel 10. A better form of transmission for C might be $C = 0557235333105825396255314916602919 29$.

The encrypted message C arrives at the decryption device 15 of FIG. 1. The encoding key K, for use in the decryption device 15, is determined from the sender's signature S and the known random numbers R using signature storage 22 and the key creator device 24. Again, the encoding key K is produced as the coefficients of the polynomial $K_1 = S_1 R_1 - 1$ mod p. Moreover, the inverse of the sender's signature S is then given by $T = R$; thus $T = \{9, 55, 26, 62, 60, 60, 69, 57, 18, 70, 17, 1, 18, 11, 13, 5\}$.

The decoder 17 determines the coefficients M of the polynomial $M_1 = C_1 T_1 \mod(K_1 \text{ and } p)$;

The result is $M = \{11, 5, 18, 5, 14, 19, 11, 25, 27, 9, 19, 27, 1, 12, 9, 22, 5, 28\}$, which is sent to the digital to alphanumeric converter 18 to obtain the original message.

Example, continues-alternative (b) encoding key

In the encoding key generator 25, the sender's signature S is obtained from signature storage 26. Suppose $p=37$. The random number generator 23 develops random numbers between 1 and 36 as $R = \{18, 28, 25, 35, 36, 5, 28, 1, 27, 14, 5, 22, 24, 7, 9, 13, 27, 13, 3\}$.

Consider S in its polynomial form $S_1$ and R as converted to the polynomial $R_1 = 18 + 28x + 25x^2 + 35x^3 + 36x^4 + 5x^5 + 28x^6 + x^7 + 27x^8 + 14x^9 + 5x^{10} + 22x^{11} + 24x^{12} + 7x^{13} + 9x^{14} + 13x^{15} + 27x^{16} + 13x^{17} + 3x^{18}$.

The GCD tester notes that $GCD(S_1, R_1) = 1$ under modulus p. Thus $K_1 = R_1$ with result that the encoding key is $K = R$. Let K be available to the intended receiver of the message. The random numbers for the encoding key K need not be secret.

The encoder 14 calculates C, the coefficients of $C_1$, through $C_1 = S_1 M_1 \bmod(K_1 \text{ and } p)$.

which results in $C_1 = 14 + 20x + 23x^2 + 26x^3 + 28x^4 + 31x^5 + 31x^6 + 21x^7 + 20x^8 + 33x^9 + 12x^{10} + 6x^{11} + 10x^{12} + 24x^{13} + 26x^{14} + 3x^{15} + 17x^{16} + 29x^{17}$.

Thus the message is encrypted to $C = \{14, 20, 23, 26, 28, 31, 31, 21, 20, 33, 12, 6, 10, 24, 26, 3, 17, 29\}$.

which is transmitted to the receiver over communications channel 10. The alternate form for transmission is $C = 142023262831312120331206102426031729$.

The ciphertext C arrives at the decryption device 15 of FIG. 1 together with the encoding key K. The sender's signature S is obtained from signature storage 16. Both K and S are sent to the decoder 17, where the coefficients T, of the polynomial $T_1$, are calculated from the solution of $S_1 T_1 = 1 \bmod(K_1 \text{ and } p)$.

The result is $T_1 = 31 + 27x + 30x^2 + 10x^3 + 7x^4 + 20x^5 + 17x^6 + 25x^7 + 36x^8 + 12x^9 + 2x^{10} + 11x^{11} + 27x^{12} + 31x^{13} + 16x^{14} + 31x^{15} + 4x^{16} + 11x^{17}$.

with coefficients $T = \{31, 27, 30, 10, 7, 20, 17, 25, 36, 12, 2, 11, 27, 31, 16, 32, 4, 11\}$.

The decoder 17 then determines the coefficients M of the polynominal $M_1 = C_1 T_1 \bmod(K_1 \text{ and } p)$.

The result is $M = \{11, 5, 18, 5, 14, 19, 11, 25, 27, 9, 19, 27, 1, 12, 9, 22, 5, 28\}$.

which is sent to the digital to alphanumeric converter 18 to obtain the original message.

Note that, although the digitized message M and the ciphertext C are of the same length, there is no correspondence between the numbers in M with the numbers in C. For example, the letter E occurs three times in the message and is given three times by the number 5 in M. The corresponding values in C are 20, 26, and 17. Also, the number 20 in C stands for E the first time and a space the second time. Furthermore, the number 31 occurs successively in C, but the corresponding letters in the message are different. Clearly, the method produces randomness in the ciphertext C.

Algorithmic methods

The cryptographic methods in FIGS. 4a, 4b, 5a, 5b, and 6 rely on finding the coefficients of the polynomials that result from polynomial multiplication, division, and addition algorithms.

Polynomial multiplication is performed by the algorithm mult(U, V), which determines the coefficients of the polynomial produced by the multiplication of the polynomial form of U by the polynomial form of V.

Polynomial division is performed by the algorithm div(U, V), which determines the coefficients of the polynomial produced by dividing the polynomial form of U by the polynomial form of V.

Polynomial addition is performed by the algorithm add(U, V), which determines the coefficients of the polynomial produced by the addition of the polynomial form of U to the polynomial form of V.

In each of the algorithms U and V represent the coefficients of polynomials that are in the finite field $Z_p$ of integers modulo the prime number p. All calculations are done modulo p.

The mult(U, V) algorithm follows using elements of U, V and indices m, n that are local to the method. mult(U, V) for $U = \{u_0 + u_1 + \ldots + u_m\}$ and $V = \{v_0 + v_1 + \ldots + v_n\}$:

Step 1. Set $f_k = 0$ for $k = 1, 2, \ldots, m+n$ and $i \leftarrow 0$.
Step 2. $j \leftarrow 0$.
Step 3. $f_{i+j} \leftarrow f_{i+j} + u_i v_j \bmod p$. If $j = n$, go to Step 5.
Step 4. $j \leftarrow j+1$ and return to Step 3.
Step 5. If $i = n$, halt. Else, $i \leftarrow i+1$; return to Step 2.

At conclusion $F \leftarrow \text{mult}(U, V)$, where $F = \{f_0 + f_1 + \ldots + f_{m+n}\}$. The mult(U, V) algorithm ends with F as the coefficients of the polynomial produced by the multiplication.

Figure 3:
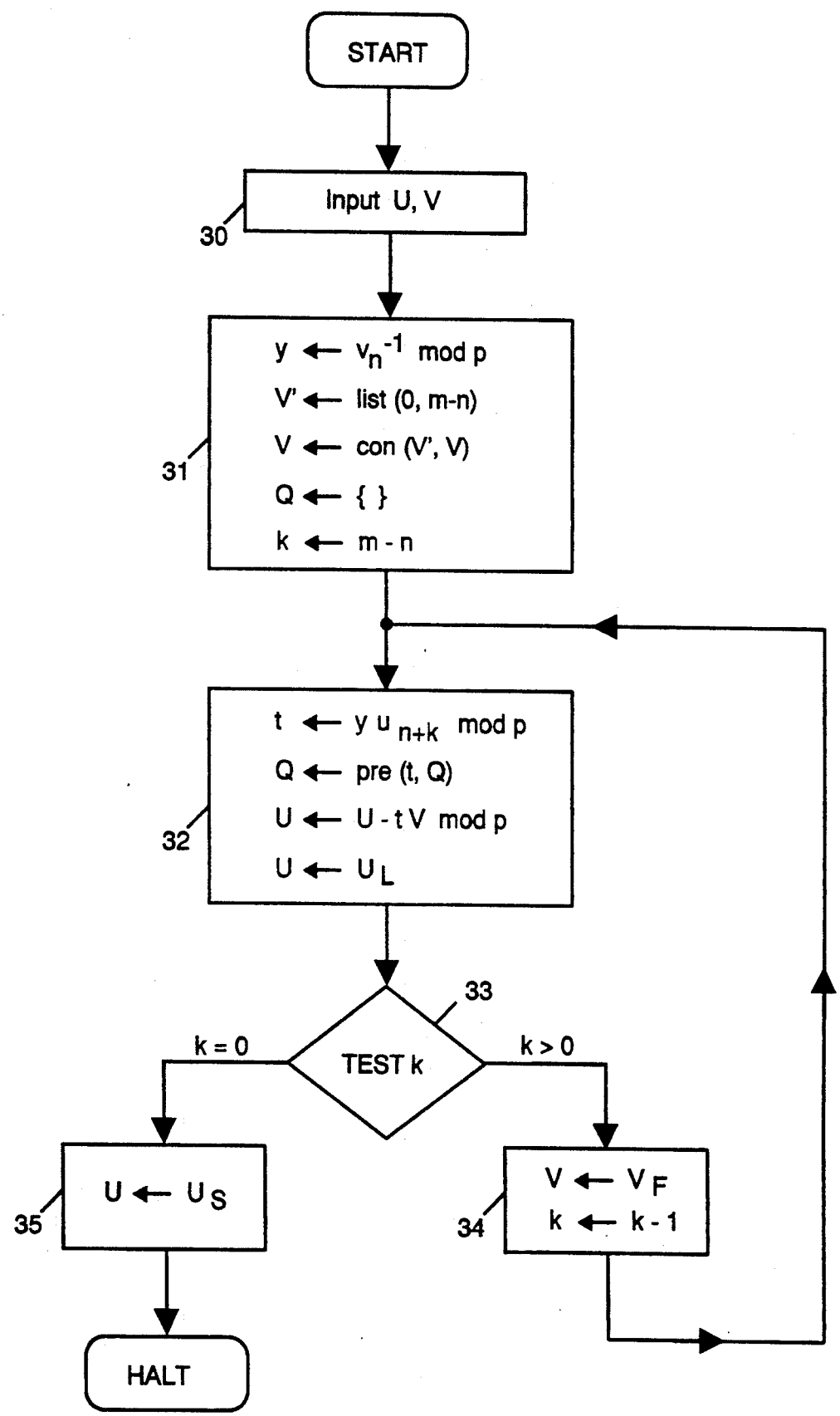
FIG. 3 is a flow chart for a division algorithm used in the flow charts of FIGS. 4a, 4b, 5b, and 6.

The div(U, V) algorithm is depicted in the flow chart of FIG. 3 for $U = \{u_0 + u_1 + \ldots + u_m\}$ and $V = \{v_0 + v_1 + \ldots + v_n\}$; the elements of U, V and indices m, n are local to the method. An explanation of the various portions of the division algorithm, div(U, V), of FIG. 3 follows.

Block 30. Input U, V. Input of lists U, with values $u_i$, and V, with values $v_i$.

Block 31. The initial values for the procedure follow. $y \leftarrow v_n^{-1} \bmod p$. Constant y is obtained by solving for y from $v_n y = 1 \bmod p$.
$V' \leftarrow \text{list}(0, m-n)$. $V'$ is a list consisting of $m-n$ zeros.
$V \leftarrow \text{con}(V', V)$. V is replaced by the concatenation of $V'$ and V.
$Q \leftarrow \{\}$. Q is an initial quotient with no members.
$k \leftarrow m-n$. k is initialized at the value $m-n$.

Block 32. The main part of the procedure continues.

$t \leftarrow yu_{n+k}$ mod p. Calculate t as the value given by $yu_{n+k}$ mod p.

$Q \leftarrow pre(t, Q)$. Prefix Q with t as leading value.

$U \leftarrow U - tV$ mod p. Replace U by the element by element calculation $U - tV$ mod p.

$U \leftarrow U_L$. Change U by dropping its last term.

Block 33. TEST k refers to two possibilities for k.

k>0. The main part of the method is to be repeated after the changes in Block 34 are made.

k=0. The method will end with Block 35.

Block 34. $V \leftarrow V_F$. Change V by dropping its first term; $k \leftarrow k-1$ denotes that k is reduced by one. The method continues in Block 32 with the new values.

Block 35. $U \leftarrow U_S$. Change U by stripping U of all its higher order zeros.

The div(U, V) algorithm ends with Q as the coefficients of the quotient polynomial and final U as the coefficients of the remainder polynomial resulting from the division.

The add(U, V) algorithm follows using elements of U, V and indices m, n that are local to the method. add(U, V) for $U = \{u_0 + u_1 + \ldots + u_m\}$ and $V = \{v_0 + v_1 + \ldots + v_n\}$:

Step 1. $k \leftarrow$ minimum(m, n), $r \leftarrow$ maximum(m, n), $i \leftarrow 0$.

Step 2. $f_i \leftarrow u_i + v_i$ mod p.

Step 3. If i=k, go to Step 4. Else, $i \leftarrow i+1$; return to Step 2.

Step 4. $F \leftarrow \{f_0 + f_1 + \ldots + f_k\}$. If m=n, halt.

Step 5. If n>m then $F' \leftarrow \}v_{n-1} + \ldots + v_m\}$. Else m>n, $F' \leftarrow \{u_{m+1} + \ldots + u_n\}$ Step 6. $F \leftarrow con(F, F')$, halt.

At conclusion $F \leftarrow add(U, V)$, where $F = \{f_0 + f_1 + \ldots + f_r\}$. In Step 6, con(F, F') stands for the concatenation of F and F'. The add(U, V) algorithm ends with F as the coefficients of the polynomial produced by the addition.

Cryptographic methods

Figure 4A:
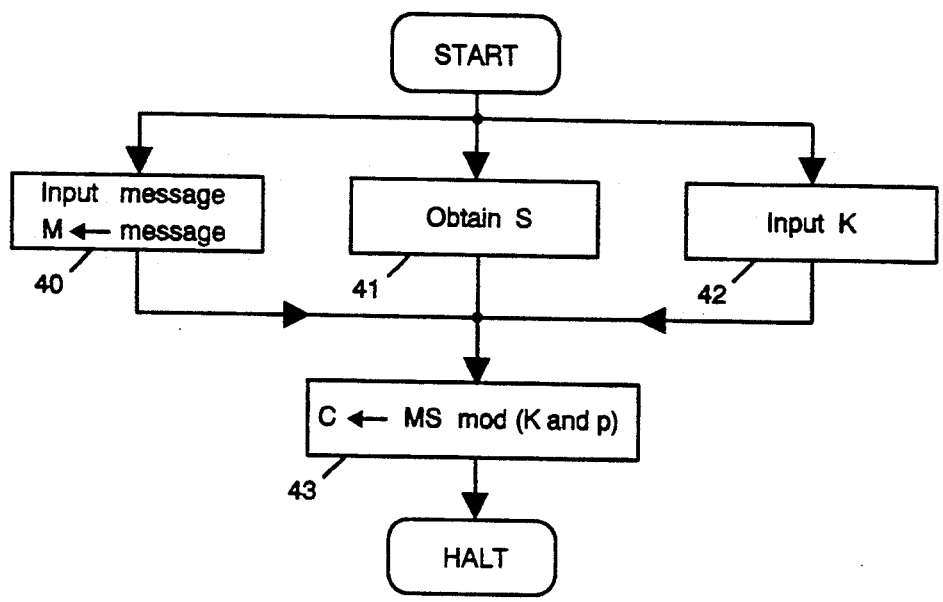
FIG. 4a is a flow chart for a cryptographic method that implements a system for encoding a plaintext message into ciphertext.

FIG. 4a is a flow chart of a cryptographic method for encoding a plaintext message into ciphertext. The method is used in the encryption device 11 of FIG. 1. The sender encrypts the message from its digitized form, $$M = \{m_0, m_1, \ldots, m_r\},$$

to its enciphered form, $$C = \{c_0, c_1, \ldots, c_t\},$$

through the use of the sender's signature, $$S = \{s_0, s_1, \ldots, s_n\},$$

known only to the sender and authorized receivers and an encoding key, $$K = \{k_0, k_1, \ldots, k_u\},$$

that becomes known to both sender and receiver. The lists M, C, S, and K all contain elements that represent polynomial coefficients that are in the finite field $Z_p$ of integers modulo the prime number p.

The depiction of the various portions of the method in the flow chart of FIG. 4a follows.

Block 40. Input message. The sender's plaintext message is input into the system.

$M \leftarrow$ message. The message is converted into digital form M.

Block 41. Obtain S. The sender's secret signature S is obtained in the encryption system.

Block 42. Obtain K. The encoding key K is either $K \leftarrow SR-1$ mod p as in the flow chart of FIG. 5a, or $K \leftarrow R$ as in the flow chart of FIG. 5b.

Block 43. $C \leftarrow MS$ mod(K and p). Ciphertext C is obtained by first finding $F \leftarrow mult(M, S)$ and then $C \leftarrow div(F, K)$.

Figure 4B:
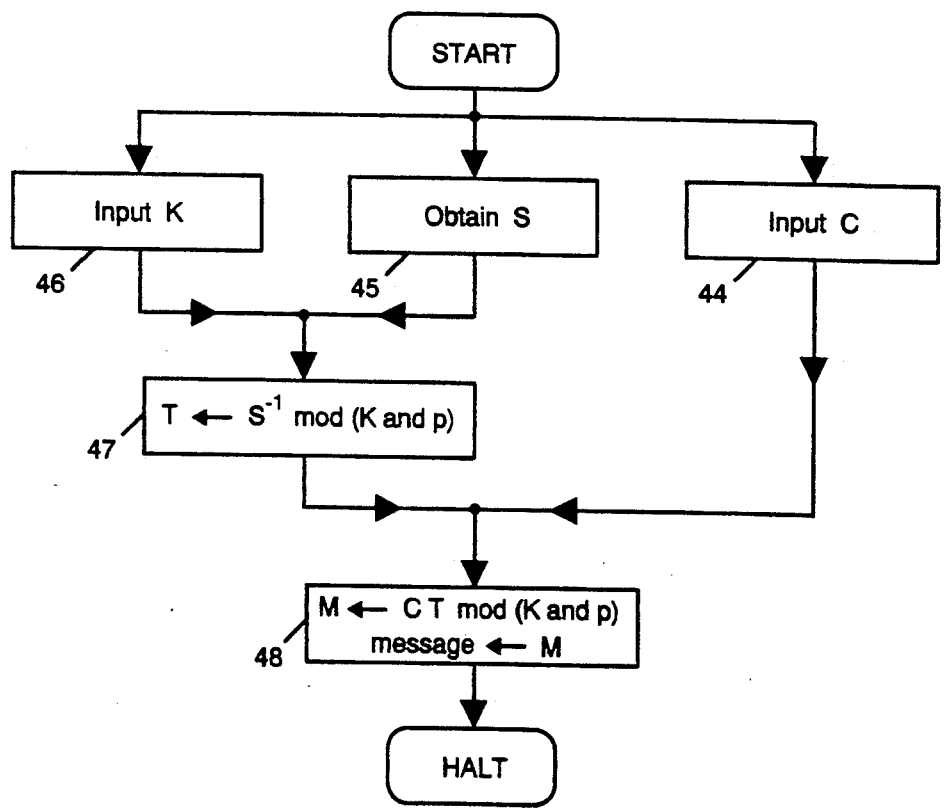

FIG. 4b is a flow chart for a cryptographic method for decoding the ciphertext message C developed by the flow chart of FIG. 4a. The method is used in the decryption device 15 of FIG. 1. Ciphertext C is transmitted to a receiver who has knowledge of signature S and encoding key K. The receiver's system determines the list, $$T = \{t_0, t_1, t_2, \ldots, t_g\},$$

that is the inverted form of signature S. The list T contains elements that represent polynomial coefficients that are in the finite field $Z_p$ of integers modulo the prime number p. T converts C to the digitized message M. The original message is then obtained from M.

A further depiction of the various portions of the method given in the flow chart of FIG. 4b follows.

Block 44. Input C. Ciphertext C is acquired at the receiver.

Block 45. Obtain S. The sender's secret signature S is obtained in the decryption system.

Block 46. Obtain K. The encoding key K is the same as the one used in Block 42 of FIG. 4a.

Block 47. $T \leftarrow S^{-1}$ mod(K and p). Determine T, the inverted form of S. When $K \leftarrow SR-1$ mod p, as in the flow chart of FIG. 5a, T is given by $T \leftarrow R$. When $K \leftarrow R$, as in the flow chart of FIG. 5b, T is obtained as the output from the signature inversion procedure in the flow chart of FIG. 6.

Block 48. $M \leftarrow CT$ mod(K and p). The digitized message M is obtained by first finding $F \leftarrow mult(C, T)$ and then $M \leftarrow div(F, K)$.

message $\leftarrow M$. The original message is obtained from M.

Figure 5A:
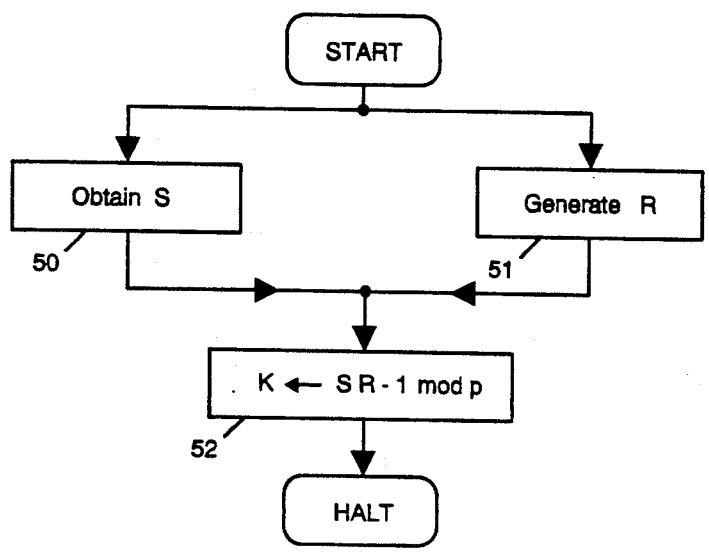

FIG. 5a is a flow chart for the method that develops the alternative (a) encoding key K from the encoding key generator 21 of FIG. 2a. A further depiction of the various portions of the method given in the flow chart follows.

Block 50. Obtain S. The sender's secret signature S is obtained.

Block 51. Generate R. A string of random numbers is produced.

Block 52. $K \leftarrow SR-1$ mod p. Encoding key K is produced by the modulo p subtraction of 1 from the first term of the list formed by the procedure mult(S, R).

Figure 5B:
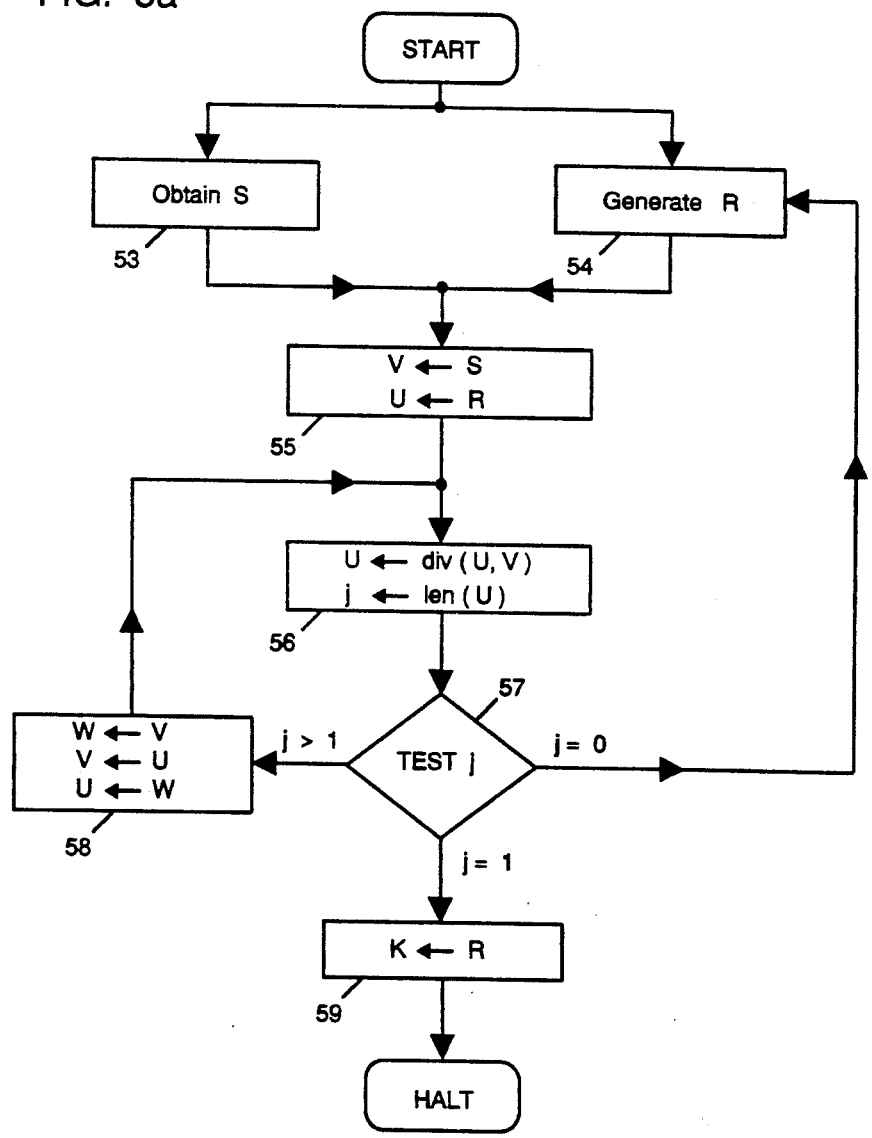
FIG. 5b is a flow chart for a method that implements the alternative (b) encoding key generator of FIG. 2b.

FIG. 5b is a flow chart for the method that develops the alternative (b) encoding key K from the encoding key generator 25 of FIG. 2b. The method is used with the GCD Tester 28 to obtain a string of random numbers R so that the polynomial forms of R and signature S have a greatest common divisor of one. A further depiction of the method in the flow chart follows.

Block 53. Obtain S. The sender's secret signature S is obtained.

Block 54. Generate R. A string of random numbers is produced.

Block 55. $V \leftarrow S$, $U \leftarrow R$. List V takes on the values of S and list U takes on the values of R.

Block 56. U←div(U, V). The U values obtained are the coefficients of the remainder polynomial resulting from the division.

j←len(U). The value j is a count of the number of elements of the remainder list U. The length of U can be 0, 1, or greater than 1.

Block 57. TEST j. Three possibilities exist for j.

j>1. The polynomial form of the remainder U still has a polynomial format. The main part of the procedure is to be repeated for new values to be given in Block 58.

j=1. The remainder U is a positive constant. The procedure ends with Block 59.

j=0. The polynomial forms of S and R have a polynomial in common. Return is made to Block 54; a new list of random numbers R is generated.

Block 58. W←V, V←U, U←W. The necessary replacements are made for the continuation of the method with Block 56.

Block 59. K←R. An R has been found where the polynomial forms of R and S have a greatest common divisor of one; the encoding key K takes the values of R.

Figure 6:
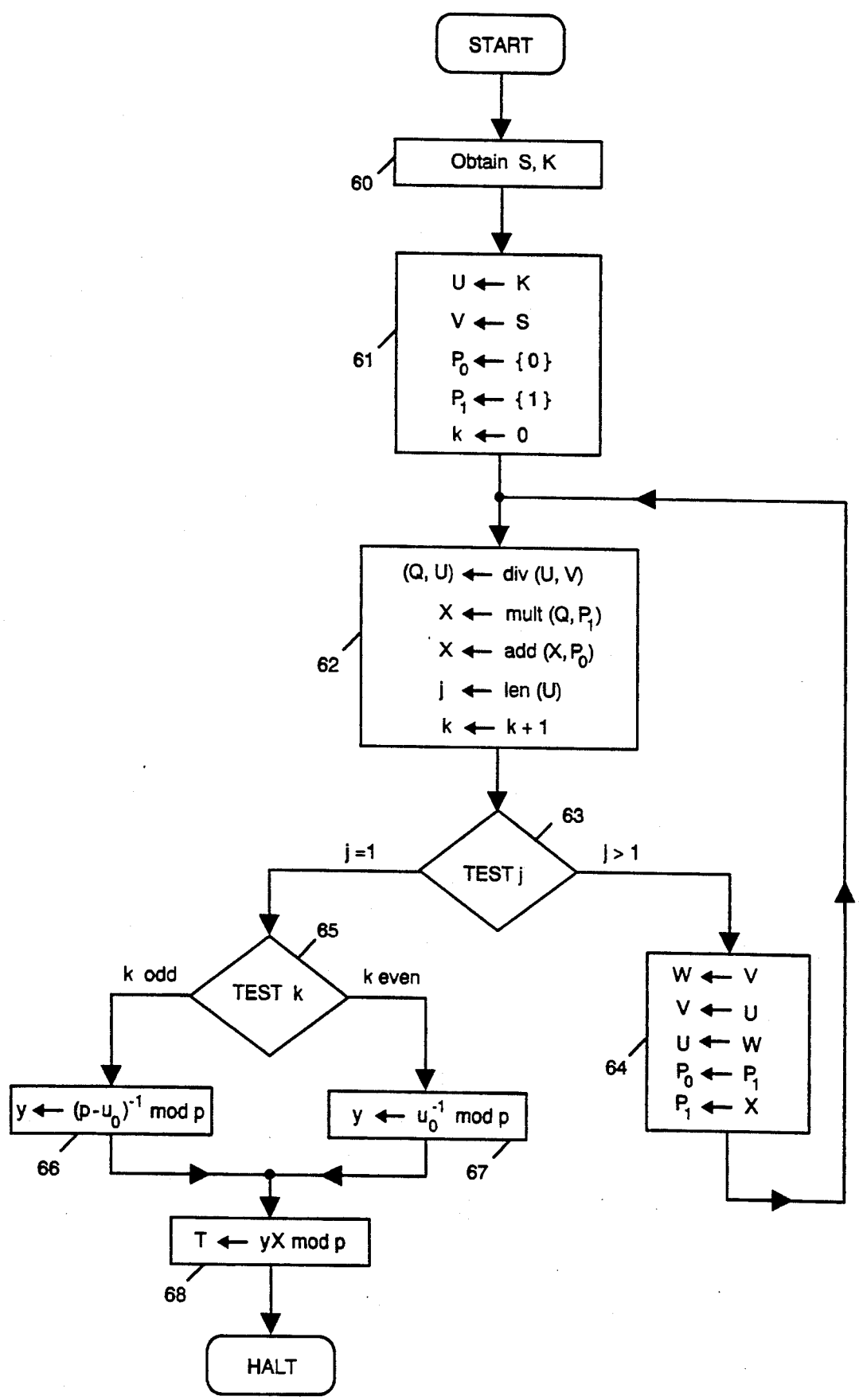
FIG. 6 is a flow chart for a signature inversion procedure used in the flow chart of FIG. 4b.

FIG. 6 is a flow chart of the inversion procedure T←$S^{-1}$ mod(K and p) of Block 47 in FIG. 4b when the encoding key K is developed as K←R as in FIG. 5b. An explanation of the various portions of the procedure of FIG. 6 follows.

Block 60. Obtain S, K. The sender's signature S and the encoding key K is obtained in the decryption system.

Block 61. Initial values are given.

U←K, V←S. List U takes on the values of K and list V takes on the values of S.

$P_0$←{0}, $P_1$←{1}, j←0. $P_0$ is a list with the element 0, $P_1$ is a list with the element 1, and j is a counter set to 0.

Block 62. The main part of the procedure continues.

(Q, U)←div(U, V). The Q values obtained are the coefficients of the quotient polynomial resulting from the division. The U values obtained are the coefficients of the remainder polynomial resulting from the division.

X←mult(Q, $P_1$), X←add(X, $P_0$). Coefficient list X is obtained by multiplying the polynomial form of Q by the polynomial form of $P_1$ and then adding the polynomial form of $P_0$ to the result.

j←len(U). The value j is a count of the number of elements of the remainder list U. The length of U can be 1 or greater than 1.

k←k+1. The number of times Block 62 is entered is increased by 1.

Block 63. TEST j. Two possibilities exist for j.

j>1. The remainder U still has a polynomial format. The main part of the procedure is to be repeated for new values to be given in Block 64.

j=1. The remainder U is a positive constant $u_0$. The procedure will end starting with Block 65.

Block 64. W←V, V←U, U←W, $P_0$←$P_1$, $P_1$←X. Replacements necessary for the continuation of the method with Block 62.

Block 65. TEST k. Two possibilities exist for k.

k odd. The number of steps in the procedure is an odd number; the method continues with Block 66.

k even. The number of steps in the procedure is an even number; the method continues with Block 67.

Block 66. y←$(p-u_0)^{-1}$ mod p. Constant y is obtained by solving for y from $(p-u_0)y=1$ mod p.

Block 67. y←$u_0^{-1}$ mod p. Constant y is obtained by solving for y from $u_0 y = 1$ mod p.

Block 68. T←yX mod p. T is the inverted form of S and is given by the element by element calculation yX mod p.

I claim:

1. A method for establishing cryptographic communications between a sender and a receiver; said method developed at said sender comprising the steps of:

A. considering a sequence of digital message words $$M = \{m_0, m_1, \ldots, m_r\}, 1 \leq m_i \leq p-1, \text{ p a prime number.}$$

B. regarding the polynomial form of M as $$M_1 = m_0 + m_1 x + m_2 x^2 + \ldots + m_r x^r;$$

C. using said sender's signature number sequence $$S = \{s_0, s_1, \ldots, s_n\}, 1 \leq s_i \leq p-1,$$

as the polynomial form $$S_1 = s_0 + s_1 x + s_2 x^2 + \ldots + s_n x^n;$$

D. developing an encoding key $$K = \{k_0, k_1, \ldots, k_u\},$$

with polynomial form $$K_1 = k_0 + k_1 x + k_2 x^2 + \ldots + k_u x^u;$$

E. transforming said digital message words M into a sequence of ciphertext words C as coefficients of the polynomial defined by $$C_1 = S_1 M_1 \text{ mod}(K_1 \text{ and } p)$$

that results in $$C_1 = c_0 + c_1 x + c_2 x^2 + \ldots + c_v x^v$$

and ciphertext $$C = \{c_0, c_1, \ldots, c_v\}.$$

which is then sent to an authorized receiver; said method developed at said receiver comprises the additional steps of:

F. considering said acquired ciphertext $$C = \{c_0, c_1, \ldots, c_v\},$$

in its polynomial form $$C_1 = c_0 + c_1 x + c_2 x^2 + \ldots + c_v x^v;$$

G. using said sender's signature $$S = \{s_0, s_1, \ldots, s_n\}$$

as the polynomial form $$S_1 = s_0 + s_1 x + s_2 x^2 + \ldots + s_n x^n;$$

H. using said encoding key $$K = \{k_0, k_1, \ldots, k_u\}$$

as the polynomial form $$K_1 = k_0 + k_1 x + k_2 x^2 + \ldots + k_u x^u;$$

I. using T, an inverse sequence to S, as $$T = \{t_0, t_1, t_2, \ldots, t_g\}$$

with polynomial form $$T_1 = t_0 + t_1 x + t_2 x^2 + \ldots + t_g x^g$$

where $$S_1 T_1 = 1 \bmod (K_1 \text{ and } p);$$

J. transforming said ciphertext words C into said digital message words M from the coefficients of the polynomial $M_1$ defined by $$M_1 = C_1 T_1 \bmod (K_1 \text{ and } p),$$

which results in $$M_1 = m_0 + m_1 x + m_2 x^2 + \ldots + m_r x^r$$

with said original digital message words being $$M = \{m_0, m_1, \ldots, m_r\}.$$

2. A method for developing an encoding key K and a random signature inversion T comprising the steps of:

A. using a sender's signature number sequence $$S = \{s_0, s_1, \ldots, s_n\}, 1 \leq s_i \leq p-1, p \text{ a prime number.}$$

as the polynomial form $$S_1 = s_0 + s_1 x + s_2 x^2 + \ldots + s_n x^n;$$

B. developing a sequence of random digits $$R = \{r_0, r_1, \ldots, r_s\}, 1 \leq r_i \leq p-1.$$

with polynomial form $$R_1 = r_0 + r_1 x + r_2 x^2 + \ldots + r_s x^s;$$

C. producing said encoding key K from the coefficients of the polynomial $K_1$ defined by $$K_1 = S_1 R_1 - 1 \bmod p,$$

which results in $$K_1 = k_0 + k_1 x + k_2 x^2 + \ldots + k_u x^u$$

and the encoding key $$K = \{k_0, k_1, \ldots, k_u\};$$

D. obtaining the inverse of signature S from the result $$S_1 R_1 = 1 \bmod (K_1 \text{ and } p).$$

which produces $T_1 = R_1$ as the inverse polynomial to $S_1$ and $T = R$ as the inverse of S with T in the form $$T = \{t_0, t_1, t_2, \ldots, t_g\}.$$

3. A method for developing a random encoding key K with the further development of a signature inversion T comprising the steps of:

A. using a sender's signature number sequence $$S = \{s_0, s_1, \ldots, s_n\}, 1 \leq s_i \leq p-1, p \text{ a prime number.}$$

as the polynomial form $$S_1 = s_0 + s_1 x + s_2 x^2 + \ldots + s_n x^n;$$

B. developing a sequence of random digits $$R = \{r_0, r_1, \ldots, r_s\}, 1 \leq r_i \leq p-1.$$

with polynomial form $$R_1 = r_0 + r_1 x + r_2 x^2 + \ldots + r_s x^s$$

so that $GCD(S_1, R_1) = 1$;

C. taking $K_1 = R_1$, which produces $K = R$ as the encoding key and the form of K as $$K = \{k_0, k_1, \ldots, k_u\};$$

D. determining the inverse of signature S from the calculation of the $T_1$ that satisfies $$S_1 T_1 = 1 \bmod (K_1 \text{ and } p)$$

and produces $$T_1 = t_0 + t_1 x + t_2 x^2 + \ldots + t_g x^g$$

as the inverse polynomial to $S_1$ with the inverse of S as in the form $$T = \{t_0, t_1, t_2, \ldots, t_g\}.$$

4. A cryptographic system for sending messages over a communications channel comprising: an encryption system and a decryption system, said encryption system including, a first input means for inserting a plaintext message in alphanumeric form into said encryption system;

a converter means coupled to said input means for transforming the plaintext message from its alphanumeric form into a digital form $$M = \{m_0, m_1, \ldots, m_r\};$$

a first signature storage means for obtaining a message sender's signature $$S = \{s_0, s_1, \ldots, s_n\};$$

a second input means for inserting an encoding key $$K = \{k_0, k_1, \ldots, k_u\},$$

into the system;

an encoder means coupled to said converter means, said signature storage means, and said second input means for linking said digital message M, said signature S, and said encoding key K to obtain an encoded form of the message by said encoder means considering M, K, and S as converted to their polynomial forms $$M_1 = m_0 + m_1x + m_2x^2 + \ldots + m_rx^r.$$

$$K_1 = k_0 + k_1x + k_2x^2 + \ldots + k_ux^u.$$

$$S_1 = s_0 + s_1x + s_2x^2 + \ldots + s_nx^n.$$

and developing a ciphertext C as the coefficients of the polynomial $C_1$ produced from $$C_1 = S_1M_1 \bmod(K_1 \text{ and } p)$$

as given by $$C_1 = c_0 + c_1x + c_2x^2 + \ldots + c_vx^v.$$

with result that said ciphertext is $$C = \{c_0, c_1, \ldots, c_v\};$$

a transmitting means coupled to said encoder means for sending said ciphertext C over said communications channel; and said decryption system having, a receiving means for acquiring the ciphertext $$C = \{c_0, c_1, \ldots, c_v\}$$

from said communications channel for insertion into said decryption system;
a second signature storage means for obtaining the sender's signature $$S = \{s_0, s_1, \ldots, s_n\};$$

a third input means for inserting the encoding key $$K = \{k_0, k_1, \ldots, k_u\}$$

into said decryption system;
a decoder means coupled to said receiving means, said second signature storage means, and third input means for determining T, the inverted form of the signature S, and the digital message M by said decoder means considering S and K as converted to their polynomial forms $$S_1 = s_0 + s_1x + s_2x^2 + \ldots + s_nx^n.$$

$$K_1 = k_0 + k_1x + k_2x^2 + \ldots + k_uu^u.$$

developing T as the coefficients of the polynomial $T_1$ produced from $$S_1T_1 = 1 \bmod(K_1 \text{ and } p)$$

with result that $$T_1 = t_0 + t_1x + t_2x^2 + \ldots + t_gx^g$$

and $$T = \{t_0, t_1, t_2, \ldots, t_g\}$$

and then linking T with the ciphertext C, considered in its polynomial form $$C_1 = c_0 + c_1x + c_2x^2 + \ldots + c_vx^v.$$

and the encoding key K to obtain the digital message M as the coefficients of the polynomial $M_1$ defined by $$M_1 = C_1T_1 \bmod(K_1 \text{ and } p).$$

with result $$M_1 = m_0 + m_1x + m_2x^2 + \ldots + m_rx^r$$

and digital message $$M = \{m_0, m_1, \ldots, m_r\};$$

a converter means coupled to said decoder means for transforming the digital message M into the original plaintext message.

5. A system for developing an encoding key K comprising:
a signature storage means for obtaining a message sender's signature $$S = \{s_0, s_1, \ldots, s_n\};$$

a random number generator means for obtaining a string of random numbers $$R = \{r_0, r_1, \ldots, r_s\};$$

a key creator means coupled to said signature storage means and said random number generator means for developing an encoding key K by said key creator means considering S and R as the polynomials forms $$S_1 = s_0 + s_1x + s_2x^2 + \ldots + s_nx^n$$

$$R_1 = r_0 + r_1x + r_2x^2 + \ldots + r_sx^s$$

and developing the encoding key K as the coefficients of the polynomial $K_1$, defined by $$K_1 = S_1R_1 - 1 \bmod p.$$

as $$K_1 = k_0 + k_1x + k_2x^2 + \ldots + k_ux^u$$

with resulting encoding key $$K = \{k_0, k_1, \ldots, k_u\}.$$

6. A system for developing an encoding key K comprising:
a signature storage means for obtaining a message sender's signature $$S = \{s_0, s_1, \ldots, s_n\};$$

a random number generator means for obtaining a string of random numbers $$R = \{r_0, r_1, \ldots, r_s\};$$

a greatest common divisor (GCD) tester means coupled to said signature storage means and said random number generator means for developing the encoding key K by said GCD tester means considering S and R as the polynomials forms $$S_1 = s_0 + s_1x + s_2x^2 + \ldots + s_nx^n$$

$$R_1 = r_0 + r_1x + r_2x^2 + \ldots + r_sx^s$$

and obtaining a suitable R, with the property that GCD($S_1$, $R_1$)=1 modulo p, with the result that the encoding key is given by K=R and is of the form $$K = \{k_0, k_1, \ldots, k_u\};$$

when no suitable R is obtained, the GCD is not one, said GCD tester means signals said random number generator means to develop a new string of random numbers R for testing and producing the encoding key K.

* * * * *